May 15, 1951  J. R. BIRD ET AL  2,552,707
HIGH-FREQUENCY COAXIAL COUPLING DEVICE
Filed Aug. 21, 1946

INVENTORS
JAMES RAYMOND BIRD
MARTIN M. WELLS
BY Evans & McCoy
ATTORNEYS

Patented May 15, 1951

2,552,707

UNITED STATES PATENT OFFICE 2,552,707

HIGH-FREQUENCY COAXIAL COUPLING DEVICE

James Raymond Bird, Chagrin Falls, and Martin M. Wells, Cleveland, Ohio, assignors to Bird Electronic Corporation, Cleveland, Ohio, a corporation of Ohio Application August 21, 1946, Serial No. 692,116

25 Claims. (Cl. 178—44)

This invention relates to electrical circuits and more particularly to the construction, assembly and interconnection of high frequency alternating current lines and devices for the transmission and dissipation of radio frequency energy.

In the transmission, measuring and testing of high frequency electrical currents and devices it is frequently desirable to employ resistances which are independent of the frequency and substantially purely ohmic in character. It has been developed in theory that resistance units exhibiting substantially pure ohmic characteristics can be obtained if the inductance and the capacitance of the unit are so proportioned that at any point along the length of the unit they have a relationship represented in the following equation or formula:

$$Z_{in} = \sqrt{L/C} = Z_0 \qquad (A)$$

In which:

$Z_{in}$ = input impedance in ohms of the resistor unit and the connections thereto looking into the unit.

$Z_0$ = characteristic impedance in ohms across the section at which the input impedance is measured.

L = inductance in henries per unit length of uniform section as determined by the parameters of the section mentioned.

C = capacitance in farads per unit length of uniform section as determined by the parameters of the section mentioned.

The transition from a theoretical design, calculated to exhibit a characteristic impedance at each line element equal to the ohmic resistance of the line, to a commercially practical structure, has been extremely troublesome. It has been recognized that a system for use in high frequency applications and which exhibits substantially pure ohmic resistance characteristics can be built about a coaxial line comprising inner and outer conductors, so formed that the ratio of their diameters diminishes in accordance with an exponential law. The exponential law is satisfied in an arrangement wherein the surge or characteristic impedance of the line at any point is equal to the resistance of the line measured between the conductors at such point. One suitable arrangement is a structure including a tapered horn embracing a cylindrical resistance. The horn serves as a return conductor and is shaped in accordance with the above logarithmic or exponential law. It constitutes the outer conductor of a coaxial device, while the resistance constitutes the inner conductor of such device.

In developing a high frequency device or line structure satisfying the requirements mentioned numerous difficulties are encountered. The cross sectional or diametrical dimensions of the physical device must be larger in most instances than the transmission line with which it is to be used. This follows because of heat dissipation requirements in certain applications of the device and because of practical problems in fabrication and assembly. It is therefore necessary to provide connecting means for effecting a transition between the conductors of a high frequency coaxial line and the members or parts of the line structure in question. This transition design includes a transition not only in diameter but also in dielectric.

The above mentioned exponentially shaped device produces a constant input resistance for all frequencies at the input end or looking into the resistance from the plane of the section coincident with the start of the resistance. The diameters at this plane are chosen so that the resulting device will be large enough to handle and dissipate the power for which it is intended. One of the first problems encountered is that of making connections between a resistor and a transmission line of characteristic impedance equal to that of the resistor, the resistor and transmission line having different dielectrics and having different diameters, without having the connector section or zone introduce changes in the characteristic impedance of the line or of the device.

The designing of a resistor or attenuator for high frequency application must include consideration of the connecting means by which the device is to be connected into the electrical circuit. It is not satisfactory to design the resistor considering only the resistive elements, but attention must be also directed to the characteristics of the connectors.

It is accordingly the principal object of the present invention to provide a high frequency line structure or resistor unit which will act as a pure resistance at any frequency, that is, a resistor having a known constant resistive impedance equal to the characteristic or surge impedance of the line, and will provide a non-reflecting termination for a transmission line that will be of constant impedance and substantially free from reactance at all frequencies. More specifically the invention aims to provide a non-reflecting dissipative line of concentric members having a diminishing diameter ratio toward one end thereof.

Another object is to provide in a line structure for high frequency applications means for effecting a transition between a coaxial line having a solid dielectric and a fluid or air dielectric coaxial structure.

Another object is to provide a line structure for high frequency applications which facilitates assembly and disassembly while maintaining a relatively large degree of electrical accuracy to avoid the formation of standing waves and reflections.

A further object of the invention is to provide a line structure for high frequency use which is relatively simple in design and construction and inexpensive to manufacture. Other objects and advantages will become apparent from the following detailed description of a suitable embodiment of the invention made in connection with the accompanying drawings in which.

Figure 1:
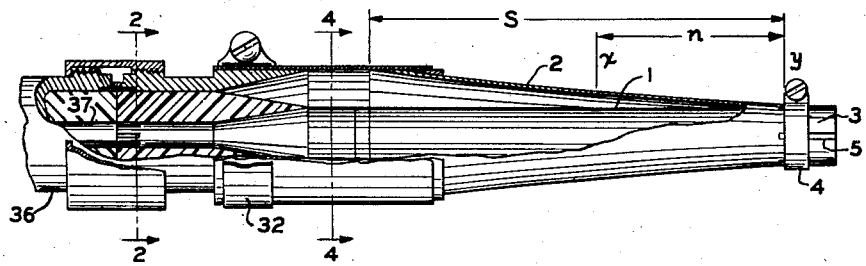
Fig. 1 is an elevational view partly in section and with parts broken away, showing a line terminator or dummy antenna attached to a coaxial transmission line.
Figure 2:
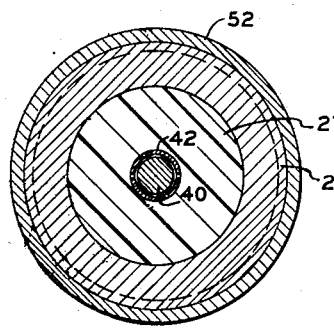
Fig. 2 is a section taken substantially on the line 2—2 of Fig. 1 and enlarged with respect thereto.
Figure 3:
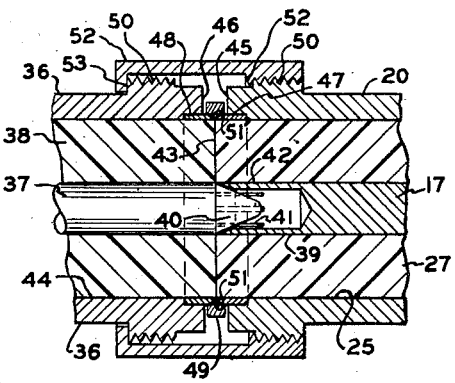
Fig. 3 is a sectional detail showing the connection between the dissipative line device and the coaxial transmission line.
Figure 4:
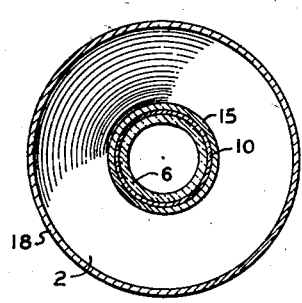
Fig. 4 is a section taken substantially on the line 4—4 of Fig. 1 and enlarged with respect thereto.

Referring to the drawings by numerals of reference which indicate like parts throughout the several views, the illustrative embodiment of the dissipative line structure of the present invention comprises an assembly of several cooperating parts including a hollow cylindrical resistor member indicated generally by the numeral 1, enclosed in or surrounded by a tapered metal housing or shell 2. The housing, of circular cross section throughout its length, is concentric to the resistor 1 and is of trumpet or horn shape. The curvature of the horn follows the exponential or logarithmic law mentioned above and satisfies the conditions prescribed by Equation A.

The actual shape of the horn or housing is determined in relationship to the resistor member 1 and by the following procedure: If the resistor 1 has a resistance "R" and a length "s," the resistance per unit length is $R/s$. Then let "$n$" equal the distance to any point "$x$" along the resistor measured from the short circuited or right hand end "$y$," as viewed in Fig. 1. Hence the resistance from "$x$" to the end "$y$" is $nR/s$. The inside diameter of the housing 2 is made to increase uniformly from the end "$y$" according to the following formula:

$$D = de^{\left(\frac{.01663 nR\sqrt{K}}{s}\right)} \quad (B)$$

In the above formula "D" and "d" represent the inside diameter of the horn and the external diameter of the resistor respectively and "$e$" equals 2.718 (the Naperian logarithm base), and "K" is the dielectric constant of the medium between the horn and the resistor (for air $K=1$). The invention contemplates that this formula will govern the shaping of the horn or housing. However, the advantages and results of the invention are obtained if the shaping of the housing is substantially in accordance with the formula given. Departure from the shape prescribed by the formula results in obtaining the desired results to a lesser degree or extent than would otherwise prevail.

The length $s$ of the coaxial line resistor is determined by practical considerations related to power dissipation and assembly. For most applications it is satisfactory if the length of the resistor is several times that of the outer diameter of the cylindrical member 1. When the condition defined in Formula B is obtained, the input impedance of the resistor and housing combination will be substantially pure ohmic resistance and will have a magnitude represented mathematically by Formula A. The small diameter end of the housing may be formed with a relatively short cylindrical portion or throat 3 which embraces one end of the resistor 1. A circular split clamping band 4 embraces cylindrical portion 3 of the housing adjacent the juncture of the housing and the inner resistor member. Longitudinal slots 5 in the cylindrical portion 3 of the housing, which permit limited expansion and contraction of the housing to accommodate slight variations in diameter of the resistor 1, facilitate assembly in production.

The resistor 1 comprises a hollow cylindrical insulating core 6 upon the outer surface of which is deposited an extremely thin layer or coating 7 of resistance material such as carbon tungsten, platinum or other metal. The core 6 is a tube of uniform section formed of non-conducting dielectric material such as glass or a ceramic composition like that used in electrical insulators and known as electrical porcelain. The coating of resistive conducting material may be applied to the core by vaporization in rarified atmosphere, by painting of a colloid dispersion, by electrodeposition, and by other methods known in the art such as sputtering and sintering. The resistance material coated on the core 6 must form a coating thin enough so that the penetration of radio frequency currents, which tend to travel along the surface of the conductor, is sufficient to make the current density substantially uniform throughout the coating. The correction for skin effect (that is, the ratio of direct current resistance to radio frequency resistance) will then be unity and therefore substantially negligible. Although a non-uniform coating may be employed, by suitable alteration or adjustment of the housing dimensions to satisfy Equation A, the embodiment illustrated has a coating of uniform thickness which exhibits constant resistance characteristics per unit of length.

Over the resistive coating 7 may be applied a layer of protective material such as paint, lacquer or vitreous enamel. The protective coating has been omitted from the drawings for simplicity and the relative thickness of the resistive coating 7 has been greatly exaggerated for the purpose of showing the relationship of the parts. The actual thickness of the resistive layer 7 is regularly such that it could not accurately be shown to a practical scale in the drawings, the layer being in many instances of little more than molecular thickness. Objectionable skin effect is avoided by thus making the resistive layer sufficiently thin.

At the ends of the cylindrical resistor 1 the resistive coating 7 is covered by annular bands 8 of conductive material which form contact surfaces or elements for making electrical connections to the ends of the resistor. The circular contact bands 8 may be in the form of coatings of conductive metal paint or may be applied by plating or spraying of metal such as silver. The protective coating of lacquer or enamel applied about the resistive coating mentioned above and not illustrated in the drawings preferably is not applied over the contract bands 8 or, if applied, it is removed therefrom before assembly of the resistor in the line structure.

The end of the resistor 1 within the large diameter end of the casing or horn 2 has a reduced diameter portion 9 on the outer surface of which is applied a conductive metal coating 10 which extends over and makes electrical connection with the conductive band 8. The reduced diameter portion 9 of the resistor may be provided by turning down the end of the resistor on a lathe, the removal of material forming a circumferential shoulder 11 at the juncture of the reduced diameter end portion 9 and the end of the resistive coating 7. The conductive metal coating 10 is applied by spraying or sputtering metal onto the turned down end of the resistor 1, masking being applied over other portions of the resistor. Metal so applied extends continuously around the entire circumference of the reduced diameter end portion on the conductive band 8. If desired the conductive band 8 may be omitted and electrical connection made directly between the conductive metal coating 10 and the resistive coating 7.

An inner connector member 14 is formed at one end with a tubular cylindrical element 15 which is telescopically received over the reduced diameter end portion 9 of the resistor 1 and abuts the circumferential shoulder 11 of the latter. The tubular element 15 has a relatively tight sliding fit over the end of the resistor so as to make electrical connection therewith and the parts may be soldered together, the bond being effected between the metal of the tubular element 15 and the conductive metal coating 10. The diameter of the smooth outer surface of the tubular connector element 15 is substantially equal to that of the resistive coating 7 on the resistor, thus effecting an electrical connection while maintaining substantially constant diameter, it being understood that in soldering the tubular element onto the reduced diameter end portion of the resistor any cracks and crevices between the end of the tubular element and the shoulder are filled.

The inner connector 14 may be formed of copper, brass or similar metal of high conductivity and has a tapered central body portion with an outwardly directed smooth conical face 16. At the end of the connector opposite the tubular element 15 is a cylindrical conductor element 17 of less diameter than the tubular connector 15. There is thus provided a connector member having a transition portion with an outer surface of progressively decreasing diameter from the tubular element 15 to the conductor 17. The connector member 14 may be formed in one piece by casting or by turning from bar stock, the cylindrical tubular end portion 15 and the conductor element 17 being integral with the tapered body portion.

The large diameter end of the housing or horn 2 is telescopically received within a conductive cylindrical shell 18 which may be in the form of a brass or copper tube of uniform circular cross section. A tapered wedge sleeve 19 embraces the large diameter end of the horn casing 2 and is received in the angle between the horn and the cylindrical sleeve 18 to guide the latter in longitudinal or axial sliding movement over the horn and to maintain the parts in correct alignment. The large end of the casing or horn is formed with a thin or feather edge 24 around its entire circumference, which makes line contact with the smooth interior circular face of the shell 18. In this manner a transition is effected between the internal surface of the exponential horn or housing and the conductive shell without appreciable or abrupt change in diameter.

Disposed about the connector member 14 in concentric relation thereto and telescopically received in one end of the conductive shell 18 for sliding engagement therewith is an outer connector member 20. This outer connector 20 is formed with an internally tapered conical end element or portion 21 which is disposed concentrically about the tapered body of the inner connector 14 and is formed with an inwardly directed conical face 22 confronting the conical face 16 of the inner connector. The faces 16 and 22 are tapered in the same direction and the open or large diameter end of the element 21 terminates in a feather edge 23 which makes line contact with the inner surface of the conductive shell 18 throughout its entire circumferential extent. The small end of the internal conical face 22 is continuous with an internal cylindrical face 25 on the interior of connector 20.

A solid dielectric tube 27 fills the annular space between the cylindrical element 17 of the inner connector member and the confronting cylindrical face 25 of the outer connector member. This tubular dielectric may be polyethylene or such other compound having known dielectric properties as is customarily employed in making solid dielectric coaxial cables.

In the transition zone of the connector assembly, that is, in the region of the conical faces 16 and 22 of the connector members the solid dielectric tube 27 progressively changes or is reduced and tapered in cross sectional area. The dielectric material has its maximum cross section in the region of the cylindrical conductor elements 17 and 20. Over tapered portion 28 the cross section of the dielectric progressively reduces to zero approximately in the plane of the feather edge 23 of the transition end element 21 of the connector. The tapering of the solid dielectric is preferably in accordance with the principles hereinafter explained governing compound dielectric coaxial structures. Thus there is provided in the transition zone of the connector assembly a gradual change from the air dielectric utilized in the attenuating portion of the line structure and the solid dielectric employed between the faces of the inner and outer conductor elements. It is to be observed that the ends of the tapered or conical surface 16 on the inner connector member lie in substantially the same planes as the ends of the conical surface 22 of the outer connector member. These planes also define the region of the tapered dielectric portion 28.

As a feature of the present invention provision is made for the mathematical determination of compound dielectric coaxial structures. Such a structure is a combination of a pair of coaxial conductors with two or more dielectrics between them, the dielectrics being concentrically arranged sleeves.

A compound-dielectric coax or coaxial structure is present in the transition zone of the high frequency electrical device of this invention. Between the planes referred to above and located at the entrance and exit ends of the transition zone, the nominal characteristic impedance is maintained at every section. This result is obtained by proper shaping of surfaces 16, 22, and the outer surface of the solid dielectric member 28. The relationships between the diameters of the several dielectrics are established by the following mathematical expression for any section:

$$Z_0 = 138 \sqrt{\log \frac{D}{d} \left( \frac{\log d_1/d}{K_1} + \frac{\log D/d_1}{K} \right)} \quad (C)$$

In this formula for composite coaxial structures involving two concentric dielectrics of different dielectric constants, the logarithms are to the base 10 and the symbols are identified as follows:

$Z_0$ = the characteristic impedance of the section.
$D$ = major diameter of structure, or the inside diameter of the outer conductor or sheath.
$d$ = minor diameter of the structure, or the diameter of the center conductor.
$d_1$ = outside diameter of the inner dielectric, or the inside diameter of the outer dielectric.
$K_1$ = dielectric constant of the inner dielectric.
$K$ = dielectric constant of the outer dielectric.

Formula C above is derived from the basic relation set forth in Formula A, previously discussed. In Equation A the inductance and capacitance per unit length of a coaxial structure are "$L$" and "$C$" respectively. "$L$" is independent of dielectric, depending on "$d$" and "$D$" and "$C$" is that of two capacitances in series, the coaxial combinations "$K_1 d_1 d$" and "$K d_1 D$."

In the design of a frequency-independent transition line section for use in joining a solid dielectric coaxial line to an air or other dielectric coaxial line, the difficulty has been in obtaining throughout the length of the transition zone of the line a uniform or constant characteristitc impedance "$Z_0$." In accordance with the principles of the present invention, this objective is realized, within the abruptness limits for which planewave transmission holds, by tapering the inner and outer conductors of the coaxial line (and which have the diameters "$d$" and "$D$," respectively), in the usual fashion to obtain a gradual transition from one coaxial line or structure to the other coaxial line or structure of the pair being joined—plus the additional expedient of extending the solid dielectric from one of the coaxial structures into the transition zone and tapering the cross sectional area of the extended solid dielectric from one of the diameters of the solid dielectric coaxial line at one end of the transition zone to one of the diameters of the other coaxial line at the other end of the transition zone or at an intermediate point of the transition zone.

Along the line of the transition zone the characteristic impedance at every section is maintained equal to the characteristic impedance "$Z_0$" of the connected lines. In the case of the device illustrated, the inner and outer connectors of the transition zone are each uniformly tapered between the end planes at the termini of the two coaxial line structures being connected; the cross sectional area of the solid dielectric material is tapered in accordance with the requirements of Formula C to obtain the desired uniform characteristic impedance at every section along the length of the transition zone. In other words the diameters "$D$" and "$d$" are determined by the physical structure of the metal conductors of the transition zone arbitrarily selected as simple cones and the characteristic impedance at the various sections is held constant by calculating "$d_1$" to satisfy Equation C. In the structure illustrated in the drawings Equation C is satisfied when the solid dielectric also is substantially in the form of a simple cone.

For relatively small changes in the diameters of the tapered elements in the transition zone relative to the length of such elements, the requirements of Equation C are substantially satisfied at all sections when the surfaces being defined are of conical shape as shown in the drawings. For relatively large diameter changes relative to the length of the element being tapered, Formula or Equation C customarily requires that one or more of the transition zone elements be exponentially curved. It is therefore expedient to make the transition zone relatively long with respect to its major diameter. For example, it is preferred that the length of the transition zone be of a length at least about substantially equal to the major diameter "$D$" of the larger of the coaxial structures being joined.

The calculation of transition zones embodied in structures for connecting other coaxial lines may be made by the use of Formula or Equation C. For example, it may be used if either the major diameter "$D$" or the minor diameter "$d$" of the two coaxial structures to be joined are the same but different dielectrics are used in the several structures; or the larger of two coaxial line structures being joined may have the solid dielectric or higher dielectric constant.

The transition zone illustrated in the drawings may be modified by extending the solid dielectric into the transition zone as the outer of the two dielectrics rather than as the inner dielectric. In such case the inner diameter of the solid dielectric which surrounds the air dielectric is tapered in accordance with the requirements of Equation C.

Figure 5:
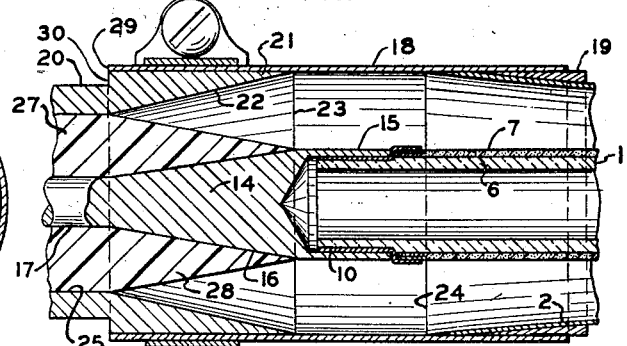
Fig. 5 is a sectional detail showing the large diameter end of the dissipative line device and the transition zone thereof.

As viewed in Fig. 5 the dielectric components and the confronting faces of the connector elements are tapered over the length of the transition zone between the plane of the feather edge 23 of the outer connector and the plane of the juncture between the conical surface 22 and the cylindrical surface 25. The dielectric and the confronting faces of the conductors adjoining both ends of the transition zone are of uniform section and diameter, the larger diameters of the sleeve 18 and of the tubular element 15 being concurrent with the air dielectric and the smaller diameters of the face 25 and of the inner conductor 17 being concurrent with the solid dielectric.

In the assembly of the line structure the exponential horn or casing 2 is placed over the resistor 1 and positioned so that the line of connection between one of the conductive bands 3 and the resistive coating 7 at the entrance or large diameter end of the resistor device falls or lies substantially in the plane of the large diameter circular end edge 24 of the casing 2. The resistor 1 and the horn or casing are retained in this adjusted position by tightening screw 31, which locks the clamping ring 4 about the small diameter end of the horn, holding the latter tightly about the end of the resistor 1 and making positive electrical contact between the internal surface of the horn or casing and the other band 8 of conductive material on the other end of the resistor.

Figure 7:
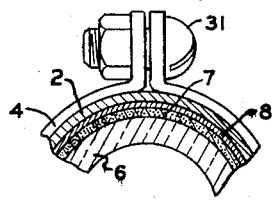
Fig. 7 is a sectional detail taken substantially on the line 7—7 of Fig. 6 and enlarged with respect thereto.
Figures 6, 8:
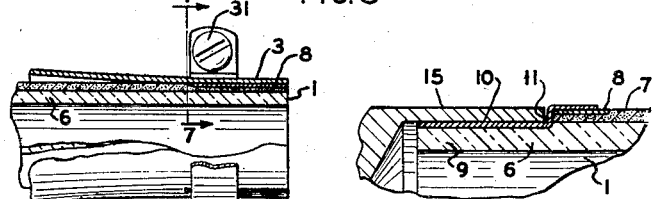
Fig. 6 is a sectional detail showing the small diameter end of the dissipative line device.
Fig. 8 is an enlarged fragmentary sectional detail showing the junction of the cylindrical resistor and the inner transition member for connecting the resistor to the center conductor of the coaxial line.

The parts are so proportioned that the circumferential contact between the internal logarithmically curved surface of the horn 2 and the resistor occurs approximately at the juncture line between the resistive coating 7 and one of the conductive bands 8, as shown in Fig. 7.

The tubular dielectric 27 and the outer connector member 20 are assembled over the inner connector member 14 and adjusted so that the ends of the several conical or tapered surfaces are disposed or fall in a common plane as previously mentioned. The sleeve 18 is placed over the exponential horn or casing 2 and the wedging sleeve 19 adjusted to align the parts, subsequently the parts are soldered or brazed together. In the assembling of the device, before the conductor sleeve or shell 18 is permanently secured to the horn or casing 2 and before the outer connector member 20 is put in place, end 29 of the shell is, by sliding the shell relative to the horn 2, made to lie in the plane of the small diameter end of the tapered or conical portion of the inner connector 14. In the subsequent assembling of the outer connector 20, it may be slid within the sleeve or shell 18 until shoulder 30 on the connector coincides with the end of the shell. Thus the shoulder and shell end serve as indexes to determine when the parts are in correct relative positions. A clamping band 33, fitted with tightening screw 34, is applied about the shell 18 to hold the latter in tight embracing relation about the connector member 20.

One use for the electrical device of the present invention is as a "dummy" antenna or line terminator. In such an application the device is assembled to a coaxial high frequency line comprising outer conductor 36 and inner conductor 37. The cylindrical face 25 of the outer connector member 20 and the cylindrical element 17, previously described, are designed to have internal and external diameters equal to the corresponding diameters of the coaxial line elements 36 and 37. Between the conductors 36 and 37 of the coaxial line is a solid dielectric tube 38 which is preferably of the same material as that used in the solid dielectric tube 27.

The end of the inner conductor element 17 is formed into a thin sectioned circular shell portion 39 which receives a tapered or conical plug portion 40 formed on the extreme end of the inner conductor 37 of the coaxial line. The shell portion 40 is of the same outer diameter as the conductor 17. A number of axial slots 41 opening through the end of the shell portion 39 provide laterally flexible fingers 42 arranged in a cylinder for simultaneous yielding contact with the tapered plug portion 40 substantially at the maximum diameter of the latter which is the diameter of the inner conductor of the coaxial line.

The solid dielectric 27 in the connector assembly compressively abuts the end of the dielectric 38 of the coaxial line and the line of abutment, indicated at 43, is disposed substantially in the plane of the ends of the flexible fingers 42. The tapered plug portion 40 on the end of the inner conductor of the coaxial line extends beyond the end of said dielectric tube 38.

In assembling the line attenuator of the present invention with the coaxial line the ends of the flexible fingers 42, which are preferably formed with feathered or tapered edges, make line contact with the inner conductor 37 approximately at the base end of the tapered plug portion 40 thereof. Thus the connection provides a substantially continuous conductor of uniform diameter and the transition between the inner conductors 17 and 37 is effected smoothly without abrupt diameter change.

The ends of the solid dielectric tubes 27 and 38 project axially beyond the outer connector member 20 and the outer line conductor 36, respectively, so that confronting end faces 45 and 46 of the outer conductors are disposed in spaced, confronting relation when the solid dielectric tubes are in abutment. At the ends of the outer conductors 20 and 36, thin contact shell elements 47 and 48 of metal such as brass, silver or copper, are received in embracing relation about and substantially flush with the ends of the dielectric tubes 27 and 38, respectively. These shells are fitted into shallow recesses formed in the interior faces of the outer conductors and abut circumferential shoulders interiorly of the conductors. The internal diameter of the shells is approximately equal to that of the conductors so as to provide smooth continuous internal conductive surfaces. In assembling the line elements the shells 47 and 48 are brought into end-to-end abutting relation to effect a positive electrical connection between the outer conductors of the structure, such connection being substantially continuous throughout the entire circumferential extent of the shells and being made along a line having a diameter approximately that of the internal faces 25 and 44 of the outer conductors. To insure the making of the electrical connection at the diameter of the outer conductors, the meeting end edges of the shells 47 and 48 are beveled at 51 about their outer end edges. A guide ring 49 embraces the portions of the shells 47 and 48 which are disposed in the space between the confronting faces 45 and 46 of the outer conductors. The ring 49 is of less width than the space separating the confronting faces 45 and 46 of the outer line conductors so as to provide clearances which permit positive abutment of the contact shells. This guide ring is freely slidable on the shells and besides guiding them into contact it serves as a reinforcement to resist collapse of the shells under axial compression.

External threads 50 are formed adjacent the ends of the outer conductors 20 and 36 so that a threaded coupling sleeve 52 may be employed to secure the conductors together. The coupling sleeve 52 is threaded at one end over less than half its axial length and at its other end is formed with a circumferentially extending inwardly directed radial flange 52 which is engageable behind a circumferential shoulder 53 at the end of the threaded portion of one of the outer conductors.

This coupling arrangement, wherein each outer conductor has a threaded end portion terminating at an inwardly directed radial shoulder, provides for interchangeable connectors in coaxial lines. Each threaded line end having a shoulder corresponding to the shoulder 53 is also fitted with a threaded coupling sleeve corresponding to the sleeve 52. In assembling coaxial lines so constructed, the coupling sleeve for either of the line ends may be employed to secure the parts together, the unused sleeve remaining idle.

During the assembly of the line structure of the present invention to a coaxial line, the parts are initially guided into correct relative position by the interfitting relation of the tapered plug end 40 received in the socket provided by the fingered shell portion 39 of the inner conductor 17. As the parts are moved into final position, the guide ring 49 cooperating with the beveled ends 51 of the contact shells 47 and 48, guides the latter into abutting relation. Tightening of the coupling sleeve 52 draws the parts firmly together, compressing the abutting end faces of the dielectric tubes 27 and 38, the dielectric being confined between the contact shells 47 and 48 and the inner conducting means. The incompressible character of the solid dielectric material acts to force the flexible fingers 42 of the inner conductor 17 tightly against and into positive electrical conducting relation to the inner conductor 37 of the coaxial line. The coupling or connector arrangement is described and claimed in copending application for patent Serial No. 214,523, filed March 8, 1951.

The structure of the present invention thus provides an arrangement wherein a coaxial line having a solid dielectric is carried through a transition zone without abrupt change in diameter ratio or line characteristics and in which the solid dielectric progressively diminishes and a different dielectric such as air progressively increases. The air dielectric portion of the line structure is of maximum diameter adjacent its central or connecting portion and diminishes in diameter toward the ends of the resistive line structure.

The employment of the transition zone, which maintains a substantially constant characteristic impedance in the line while changing from the solid dielectric to air or gas dielectric, and also while increasing the diameter of the inner and outer conductor elements of the line provides an advantageous arrangement whereby the maximum diameter of the horn or casing 2 can be made a practical size without objectionable interference with the electrical properties of the line. For obtaining usable dissipative properties in the resistor structure, the relative maximum internal diameter of the horn 2, which determines the diameter of the connecting sleeve 18, may, in accordance with the principles set forth above, be varied from that illustrated to provide a construction suited for the particular application in which the device is to be used.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What we claim is:

1. An electrical load device comprising a central conductor of circular section, an enclosing conductor also of circular section disposed concentrically about the central conductor, one of said conductors comprising a resistive film of relatively high electrical resistance and an insulating body supporting such film, the ratio of the diameters of the enclosing and central conductors decreasing toward one end of the device, and means at the other end of the device for connecting the conductors to a coaxial line, said means including inner and outer cylindrical connector elements concentrically arranged, one of the conductors and the connecting means being complementally formed with intersecting surfaces to provide substantially circular line contact at a predetermined diameter and being relatively movable axially while maintaining electrical connection therebetween and also while maintaining said predetermined diameter substantially constant in all relative positions of the parts whereby to provide a substantially constant diameter ratio between the inner and outer conductors at the plane of such electrical line connection and to provide for axial shifting of one of the conductors relative to the other conductor.

2. An electrical load device comprising circular sectioned concentric conductor members having a diminishing diameter ratio toward one end of the device, one of said conductor members comprising a resistive film of relatively high electrical resistance and a body of insulating material supporting such film, transition connector members concentrically disposed at the other end of the device for making connection with a coaxial line, at least one of the connector members being tapered, and cylindrical elements interposed between and connecting the conductor members and the transition connector members, one of the members being slidable relative to one of the elements to provide for axial adjustment in assembly, and the slidable member and said one cylindrical element being formed with smooth contoured surfaces of revolution intersecting one another in a circular substantially circumferentially continuous line contact of substantially constant diameter at all positions of adjustment to maintain a substantially constant diameter ratio between the concentric components of the device at the slidable joint.

3. In a high frequency electrical circuit a structure comprising a dissipative line of inner and outer circular sectioned concentric members, at least one of which is resistive, said line members having a diminishing diameter ratio toward one end of the structure, and means at the other end of the structure for connecting the line members to the elements of a high frequency line, said means including a connector for the inner concentric member and both an element having an internal substantially cylindrical surface and an internally tapered connector of substantially circular cross section for the outer concentric member, the cylindrically surfaced element and the tapered connector being formed complementally to make substantially circular electrical line contact with one another in a plane spaced axially from the connection between the inner member and its connector means.

4. An electrical resistor for high frequency current comprising a circular sectioned core having a resistance coating thereon, said core having at one end a reduced diameter portion, a conductive element making electrical contact with the resistance coating and extending onto the reduced portion, a conductive sleeve disposed about the reduced portion and having a diameter approximately equal to that of the coating, means for connecting the sleeve to one element of a coaxial line, and means for connecting the resistance coating at the other end of the core to another element of a coaxial line.

5. In a high frequency electrical circuit a structure comprising a dissipative line of inner and outer circular sectioned concentric members, at least one of which is resistive, said line members having a diminishing diameter ratio toward one end of the structure, and means at the other end of the structure for connecting the line members to the elements of a high frequency line, said means including concentric tapered connecting members and a cylindrical element bridging between one of the connecting members and one of the dissipative line members, the bridging element being movable relative to one such member to permit relative axial shifting of the members in assembly, the bridging element and the member relatively movable thereto being respectively formed with intersecting cylindrical and tapered surfaces to provide a substantially circular electrical line contact at the diameter of the cylindrical surface of the bridging element in all assembled positions of the element and the member.

6. An electrical load device for attenuation in a high frequency circuit comprising a central relatively resistive member of substantially cylindrical form, a conductive housing member of substantially circular section disposed substantially concentrically about the central member and having a diminishing diameter toward one end of the device, inner and outer transition connector members at the other end of the device, one of the connector members having a tapered conductive surface, the inner connector member including an end element having a substantially cylindrical external conductive surface, said end element embracing an end of the central member and establishing electrical connection therewith, and tubular means having a cylindrical internal conductive face spaced concentrically about the cylindrical end element and effecting electrical connection between the housing member and the other of the connector members, said conductive face of the tubular means being of greater diameter than axial length.

7. In a high frequency electrical circuit a structure comprising a dissipative line of circular sectioned concentric members, at least one of which is resistive, said line members having a diminishing diameter ratio toward one end thereof and the resistive portion of the one member being located substantially wholly between the axial limits of that portion of the line having the diminishing diameter ratio, members having tapered conductive surfaces of circular section for connecting the line members to the elements of a high frequency line, and elements having substantially cylindrical conductive surfaces interposed between and electrically connecting the concentric members and the connecting members at the other end of the line, at least one of the connecting elements having its conductive surface substantially of no greater axial length than diameter.

8. An electrical device for attenuation in a high frequency circuit comprising inner and outer conductors arranged in a coaxial line and having spaced confronting faces defining therebetween an annular chamber of relatively large diameter at a central portion thereof and of reduced diameter at end portions thereof adjacent the ends of the device, and at one of said ends of the device an annular tapered body of solid dielectric material disposed in one of the reduced diameter end portions of the chamber in surrounding relation to the inner conductor, one of the conductors including a portion of relatively high electrical resistance located substantially wholly between the axial limits of the reduced diameter portion of the chamber at the other end of the device.

9. An electrical device for attenuation in a high frequency circuit comprising inner and outer conductors arranged in a coaxial line and having spaced confronting faces defining therebetween an annular chamber of relatively large diameter at a central portion thereof and of reduced diameter at end portions thereof adjacent the ends of the device, and at one of said ends of the device an annular tapered body of solid dielectric material disposed in one of the reduced diameter end portions and having an annular surface in contact with one of said confronting faces, one of the conductors including a portion of relatively high electrical resistance located substantially wholly between the axial limits of the reduced diameter portion of the chamber at the other end of the device.

10. An electrical device for attenuation in a high frequency circuit comprising inner and outer conductor means arranged in a coaxial line and having confronting faces defining therebetween an elongated annular dielectric chamber centrally of relatively large diameter and tapered toward the ends of the device, and an annular body of solid dielectric material extending into said chamber from one end of the device, said dielectric material embracing the inner conductor and being of progressively reduced cross sectional area toward the central portion of the annular chamber, and one of the conductors including a portion of relatively high electrical resistance located at the other end of the device substantially wholly between the axial limits of one of the tapered portions of the dielectric chamber.

11. An electrical device for attenuation in a high frequency circuit comprising inner and outer conductors arranged in a coaxial line and having spaced confronting faces of revolution defining therebetween an annular chamber centrally of relatively large diameter and of reduced diameter at end portions thereof, the faces of the conductors toward both ends of the device progressively approaching one another, and the conductors including a resistive element to impart dissipative properties to the line, said resistive element being located substantially wholly between the axial limits of the progressively approaching conductor faces at one end of the device.

12. An electrical load device for attenuation in a high frequency circuit comprising a central member of substantially cylindrical form having a resistive film thereon, a conductive housing member of substantially circular section disposed substantially concentrically about the central member and having a diminishing diameter toward one end of the device, transition connector members coaxially arranged at the other end of the device for connecting the latter to a coaxial line, one connector member having a substantially cylindrical end element recessed to receive an end of the central member, means to establish electrical connection between said end element and the film, another connector member having a circular sectioned tapered internal face disposed substantially concentrically about one connector member, and an element having a substantially cylindrical internal face disposed substantially concentrically about the recessed end element and electrically connected between the housing member and said other connector member.

13. An electrical load device for attenuation in a high frequency circuit comprising a central member of substantially cylindrical form having a resistive film thereon, a conductive housing member of substantially circular section disposed substantially concentrically about the central member and having a diminishing diameter toward one end of the device, transition connector members coaxially arranged at the other end of the device for connecting the latter to a coaxial line, one connector member having a substantially cylindrical end element recessed to receive an end of the central member, means to establish electrical connection between said end element and the film, another connector member having a circular sectioned tapered internal face disposed substantially concentrically about said one connector member, and a cylindrical conductive sleeve element embracing and electrically connecting the larger end of the housing member to the other connector member, said sleeve element being slidable axially along at least one of the embraced members in assembly permitting relative movement of one such member toward and away from the other, said sleeve element being disposed substantially concentrically about the cylindrical end element of said one connector member.

14. An electrical load device comprising a central conductor of circular section, an enclosing outer conductor also of circular section disposed concentrically about the central conductor, one of said conductors comprising a conductive film of relatively high electrical resistance and a body of insulating material supporting such film, the ratio of the diameters of the enclosing and central conductors decreasing toward one end of the device, and means at the other end of the device for connecting the conductors to a coaxial line, said means including inner and outer cylindrical elements concentrically arranged, one of the conductors and one of the connecting elements making substantially circular knife edge electrical connection with one another and being relatively movable axially in assembly while maintaining said electrical connection to provide for axial shifting of one of the conductors relative to the other conductor.

15. A high frequency resistive device comprising inner and outer conductor members of circular cross section supported in concentric relation to one another and having a diminishing diameter ratio toward one end of the device, a portion of one of the conductors being resistive, inner and outer connector members of circular cross section supported in concentric relation to one another and respectively aligned with the inner and outer conductor members, one of the connector members and one of the conductor members having tapered conductive surfaces, and a connecting element having a substantially cylindrical conductive surface which has spaced substantially parallel circular lines of intersection with the said tapered surfaces, the connecting element embracing one of the members for relative axial sliding movement in assembly in shifting the taper surfaced members toward and away from one another in altering the space between said circular lines of intersection.

16. A high frequency resistive device comprising inner and outer conductor members of circular cross section supported in concentric relation to one another and having a diminishing diameter ratio toward one end of the device, a portion of one of the conductors being resistive, inner and outer connector members of circular cross section supported in concentric relation to one another and respectively aligned with the inner and outer conductor members, one of the connector members and one of the conductor members having tapered conductive surfaces, and a connecting element having a substantially cylindrical conductive surface which has spaced substantially parallel circular lines of intersection with the said tapered surfaces, the connecting element embracing one of the members for relative axial sliding movement in assembly in shifting the taper surfaced members toward and away from one another in altering the space between said circular lines of intersection, the embraced member having a substantially circular substantially knife edge at the large diameter end of the tapered surface thereof, said knife edge being movable to different positions along the cylindrical surface of the connecting element in said axial sliding and shifting.

17. An electrical high frequency resistive device comprising inner and outer conductors of circular cross section supported in concentric relation to one another and having a diminishing diameter ratio toward one end of the device, a portion of one of the conductors being resistive, inner and outer connectors of circular cross section supported in concentric relation to one another and aligned with the inner and outer conductors respectively, one of the connectors and one of the conductors having tapered conductive surfaces terminating substantially in spaced confronting circular knife edges, and a connecting element having a substantially cylindrical conductive surface extending across the space between the knife edges of the conductor and connector members and making substantially circular line contact with each of said knife edges, said element being axially slidable with respect to both conducting and connecting members in assembly.

18. In an electrical high frequency resistive device, a pair of inner and outer conductors arranged in a coaxial line, the inner conductor comprising a substantially cylindrical member having a resistive coating thereon, a substantially circular conductive band surrounding and bonded to the coating at one end of the cylindrical member, and the outer conductor comprising a tubular member having an internal tapered conductive surface of revolution, and resilient means substantially embracing the conductive band to maintain substantially annular electrical contact therewith, said resilient means having substantially annular electrical contact with the conductive surface of the tubular member.

19. In an electrical high frequency resistive device, a pair of inner and outer conductors arranged in a coaxial line, the inner conductor comprising a substantially cylindrical member having a resistive coating thereon, a substantially circular conductive band surrounding and bonded to the coating at one end of the cylindrical member, and the outer conductor comprising a metal sleeve having a tapered portion and an expansible substantially cylindrical portion, the cylindrical portion being disposed substantially in embracing relation about the conductive band with the juncture between the tapered and cylindrical portions of the outer conductor substantially coinciding with the juncture between the resistive coating and the conductive band.

20. In a high frequency electrical resistive device a line of circular sectioned concentric members having a diminishing diameter ratio toward one end thereof, the outer member including a radially expansible and contractible element substantially in circumferential contact with the inner member at said end and longitudinally slidable thereover in assembly, and means embracing said element to compress and hold the same against the inner member to lock the members in assembled relation.

21. For use in a high frequency electrical circuit, a resistive device comprising a coaxial line of concentric members each of circular cross section, said members having a diminishing diameter ratio toward one end of the device, the inner member being a resistor and the outer member including a radially expansible cylindrical portion embracing and in circumferential contact with the inner member at said one end, the expansible portion being longitudinally slidable over the inner member in assembly, and means embracing the cylindrical portion of the outer member at said end to compress the same against the inner member to retain the members in assembled relation.

22. An electrical resistor for high frequency current comprising an elongated circular sectional core member of ceramic material having a thin resistance coating thereon, a metal conductive member aligned with the core and having a cylindrical portion of substantially the same diameter as the core, one of the members having a reduced diameter end portion received telescopically within an end of the other member, a conductive element embracing and making electrical contact with the resistance coating about substantially the entire circumference of the core and also making electrical connection with the cylindrical portion of the metal member in a substantially circular line contact at said diameter, means for connecting the conductive metal member to one element of a coaxial line, and means for connecting the resistance coating at the end of the core remote from the embracing metal element to the other element of such coaxial line.

23. A high frequency electrical device comprising inner and outer conductors coaxially arranged and having confronting faces defining an annular dielectric chamber of substantially circular section surrounding the inner conductor, said chamber having a length axially of the device several times the chamber diameter, the face of the outer conductor including a tapered portion at each end of the device, the dielectric chamber having intermediate its ends a central portion of maximum diameter and being progressively reduced in cross sectional area and diameter toward both ends of the device within the tapered portions of the outer conductor, and one of the conductors including a portion of relatively high electrical resistance located substantially wholly within the axial limits of the tapered portion of the outer conductor at one end of the device.

24. A high frequency electrical device comprising inner and outer conductors coaxially arranged and having confronting faces defining an annular dielectric chamber of substantially circular section surrounding the inner conductor, said chamber having a length axially of the device several times the chamber diameter, the face of the outer conductor including a tapered portion at each end of the device, the dielectric chamber having intermediate its ends a central portion of maximum diameter and being progressively reduced in cross sectional area and diameter toward both ends of the device within the tapered portions of the outer conductor, one of the conductors including a portion of relatively high electrical resistance located substantially wholly within the axial limits of the tapered portion of the outer conductor at one end of the device, and an annular body of solid dielectric material surrounding a portion of the inner conductor at the other end of the device.

25. In a high frequency electrical device a coaxial structure comprising a dissipative line of inner and outer circular sectional concentric members at least one of which is of relatively high resistance and the outer one of which has a tapered internal surface, inner and outer members for connecting the device to a high frequency transmission line, said connecting members having tapered surfaces of substantially circular section arranged concentrically and aligned axially with the members of the dissipative line, and inner and outer bridging elements interposed between the connecting and line members and having substantially cylindrical surfaces arranged concentrically, the outer line and connecting members being received within the outer bridging element and having substantially cylindrical external faces slidable axially of the cylindrical surface of said outer bridging element in assembly, and the tapered surfaces of the outer line and connecting members each intersecting the cylindrical surface of the outer element to provide substantially circular electrical line contacts at the diameter of the bridging element surface in all assembled positions of the outer members and element.

JAMES RAYMOND BIRD.
MARTIN M. WELLS.

REFERENCES CITED

The following references are of record in the file of this patent:

UNITED STATES PATENTS

| Number | Name | Date |
|---|---|---|
| 1,841,473 | Green | Jan. 19, 1932 |
| 1,932,448 | Clavier | Oct. 31, 1933 |
| 2,053,808 | Young | Sept. 8, 1936 |
| 2,209,152 | Daniels | July 23, 1940 |
| 2,345,019 | Van Alstyne | Mar. 28, 1944 |
| 2,360,219 | Goddard | Oct. 10, 1944 |
| 2,379,942 | Webber | July 10, 1945 |
| 2,399,645 | Latimer | May 7, 1946 |
| 2,406,945 | Fell | Sept. 3, 1946 |
| 2,409,599 | Tiley | Oct. 15, 1946 |
| 2,425,834 | Salisbury | Aug. 19, 1947 |
| 2,438,915 | Hansen | Apr. 6, 1948 |
| 2,449,073 | Johannesen | Sept. 14, 1948 |
| 2,453,759 | Robinson | Nov. 16, 1948 |
| 2,468,775 | Ovrebo | May 3, 1949 |
| 2,497,706 | Wetherill | Feb. 14, 1950 |